United States Patent [19]

Genovese

[11] Patent Number: 5,325,121
[45] Date of Patent: Jun. 28, 1994

[54] METHOD AND APPARATUS FOR CORRECTION OF FOCUSING ARTIFACTS IN IONOGRAPHIC DEVICES

[75] Inventor: Frank C. Genovese, Fairport, N.Y.
[73] Assignee: Xerox Corporation, Stamford, Conn.
[21] Appl. No.: 995,641
[22] Filed: Dec. 18, 1992
[51] Int. Cl.[5] ............................................. G01D 15/06
[52] U.S. Cl. .................................................... 346/159
[58] Field of Search ......................................... 346/159

[56] References Cited

U.S. PATENT DOCUMENTS

| | | | |
|---|---|---|---|
| 2,981,349 | 4/1961 | Douglas . | |
| 3,128,837 | 4/1964 | Gibbons | 177/160 |
| 3,805,905 | 4/1974 | McClusky | 177/160 |
| 4,463,363 | 7/1984 | Gundlach et al. | 346/159 |
| 4,524,371 | 6/1985 | Sheridon et al. | 346/159 |
| 4,644,373 | 2/1987 | Sheridan et al. | 346/159 |
| 4,675,703 | 6/1987 | Fotland | 346/159 |
| 4,703,782 | 11/1987 | Henkel . | |
| 4,972,212 | 11/1990 | Hauser et al. | 346/159 |
| 4,973,994 | 11/1990 | Schneider | 346/159 |
| 4,996,425 | 2/1991 | Hauser et al. | 346/159 |
| 5,081,476 | 1/1992 | Genovese | 346/159 |
| 5,257,045 | 10/1993 | Bergen et al. | 346/159 |
| 5,278,588 | 1/1994 | Kubelik | 346/159 |

FOREIGN PATENT DOCUMENTS 918679  9/1954  Fed. Rep. of Germany .
2154975  9/1985  United Kingdom .

*Primary Examiner*—George H. Miller, Jr.
*Attorney, Agent, or Firm*—Mark Costello

[57] ABSTRACT

An ionographic printing system including an imaging member with a charge retentive surface on which a latent image may be formed; a printhead including a source of ions, means for moving ions from the source to the charge retentive surface in a continuous stream, and means for modulating the stream in accordance with a desired image; and in which a projection field between the charge retentive surface and the printhead tends to focus ions in a manner reducing spread in directions parallel and anti-parallel to the process direction, there is provided means for defocusing and slightly repositioning the ion stream including an additional pair of electrodes arranged adjacent to the ion stream and an A.C. voltage source with time dependent bias, to apply an A.C. field across the ion stream at a frequency selected to sweep the ion stream in two directions parallel and anti-parallel to the process direction of the device. In doing so, ions are dispersed or spread over a wider area of the charge retentive surface than would otherwise be the case, and the beam is simultaneously repositioned as necessary to correct for mechanical errors in the instantaneous position of the charge retentive surface.

7 Claims, 3 Drawing Sheets

METHOD AND APPARATUS FOR CORRECTION OF FOCUSING ARTIFACTS IN IONOGRAPHIC DEVICES

The present invention relates generally to controlling the formation of focusing artifacts in ionographic devices, and more particularly, to a method and apparatus in which the stream of ions used for marking is dithered or swept over a selected area on an imaging surface to provide more accurate images.

BACKGROUND OF THE INVENTION

In ionographic devices such as that described by U.S. Pat. No. 4,524,371 to Sheridon et al. or U.S. Pat. No. 4,463,363 to Gundlach et al., an ion producing device generates ions to be directed past a plurality of modulation electrodes for deposit on a charge retentive surface of an imaging member in imagewise configuration. In one class of ionographic devices, ions are produced at a coronode supported within an ion chamber, and a moving fluid stream entrains and carries ions produced at the coronode out of the chamber. At the chamber exit, a plurality of control electrodes or nibs are modulated with a control voltage to selectively control passage of ions through the chamber exit. Ions directed through the chamber exit are deposited on the charge retentive surface in imagewise configuration to form an electrostatic latent image developable by electrostatographic techniques for subsequent transfer to a final substrate. The arrangement produces a high resolution non-contact printing system. Other ionographic devices exist which operate similarly, but do not rely on a moving fluid stream to carry ions to a surface, such as, for example, U.S. Pat. No. 4,675,703 to Fotland or U.S. patent application Ser. No. 07/887,943 by Bergen et al.

One problem affecting the control of image quality in ionographic devices is known as "focusing". Focusing is an unavoidable phenomenon caused by a local distortion in an ionographic head design at the ion exit aperture in heads such as those described in U.S. Pat. No. 4,972,212 to Hauser et al., U.S. Pat. No. 4,973,994 to Schneider, U.S. Pat. No. 4,996,425 to Hauser et al., U.S. Pat. No. 5,081,476 to Genovese, U.S. Pat. No. 4,524,371 to Sheridon et al., U.S. Pat. No. 4,463,363 to Gundlach et al., U.S. Pat. No. 4,675,703 to Fotland and others. Generally speaking, and with reference to FIG. 1, the equipotential surfaces of the electrostatic projection field in the gap between the head and the charge retentive surface, that serve to electrostatically propel ions towards the surface, are generally planes oriented parallel to the charge retentive surface. However, at the ion exit aperture, the equipotential surfaces follow the profile of the head structure, and deviate from planes which changes the orientation of the local projection fields, as shown in FIG. 1. As ions are propelled through the projection field from the printhead aperture towards the imaging member, the field distortions at the aperture cause the ion paths to converge slightly, concentrating the ion flux into a narrower beam in the slow scan direction (the direction of relative movement between charge retentive surface and head). Thus, ions are "focused" into a smaller than desired area on the charge retentive surface. The resulting image artifacts are observed as reductions in the width of printed thin lines aligned at right angles to the fast scan direction, foreshortened characters, out-of-round dots that should be circular, and the like.

The problem exists with many types of ionographic devices, including but not limited to fluid jet assisted and non-fluid jet assisted ion devices, single apertured, and multi-apertured ion devices. An excessively narrow ion beam tends to make the charge depositing function of the printheads more sensitive to fluctuations in the process speed or motion quality of the electroreceptor.

The problem of blooming artifacts in ionographic printing has been addressed in U.S. Pat. No. 4,972,212 to Hauser, U.S. Pat. No. 4,973,994 to Schneider, and other patents. Blooming, an ionographic printing artifact resulting from previously deposited ions electrostatically repelling ions in the process of being deposited, is unidirectional with displacements in the direction opposite to surface velocity (the reverse process or reverse slow scan direction). Focusing tends to be symmetric, and in the case of an ionographic head with a slit aperture, reduces beam width parallel to the process direction.

SUMMARY OF THE INVENTION

In accordance with the invention, in an ionographic printing system, there is provided a method and apparatus for dithering or rapidly oscillating an ion stream in space to compensate for the focusing artifact and produce more pleasing images.

In accordance with one aspect of the invention, in an ionographic printing system including an imaging member with a charge retentive surface on which a latent image may be formed; a printhead including a source of ions; means for providing relative motion in a slow scan direction between the imaging member and the printhead; means for moving ions from the source to the charge retentive surface in a continuous stream, and means for modulating the stream in accordance with a desired image; and in which a projection field between the charge retentive surface and the printhead tends to focus ions in a manner reducing area coverage of the ions in both directions parallel to the slow scan direction, there is provided means equivalent to defocusing the ion stream including an additional pair of electrodes arranged adjacent to the ion stream and an A.C. voltage source, to apply an A.C. field across the ion stream at a frequency selected to alternately sweep the ion stream in parallel and antiparallel directions with respect to the slow scan directions of the device. In doing so, ions are dispersed or spread over a wider area of the charge retentive surface than would otherwise be the case.

In accordance with another aspect of the invention, in an ionographic system including an imaging member with a charge retentive surface on which a latent image may be formed; a printhead including an ion chamber, an ion exit aperture formed in the chamber, and source of ions held within the ion chamber; electrostatic and mechanical means for moving ions from the ion source to the charge retentive surface in a continuous stream through the ion exit aperture; means at the ion exit aperture for modulating the stream in accordance with an image; and means for providing relative motion in a slow scan direction between the imaging member and the printhead; there is provided means equivalent to defocusing the ions stream including an additional pair of electrodes arranged between the printhead and the charge retentive surface on upstream and downstream sides of the ion stream, and an A.C. voltage source, to apply an A.C. field across the ion stream at a frequency selected to alternately sweep the ion stream in parallel and anti-parallel directions with respect to the slow scan directions of the device. In doing so, ions are dispersed or spread over a wider area of the charge retentive surface than would otherwise be the case.

The artifacts of the focused ion stream can be reduced by dithering the ion stream electrostatically. An alternating voltage applied to electrodes straddling the modulation channel opening can provide a uniform transverse deflection field which displaces the ion paths up and downstream rapidly in time parallel to the process direction of the device.

These and other aspects of the invention will become apparent from the following description used to illustrate a preferred embodiment of the invention read in conjunction with the accompanying drawings in which:

FIG. 1 demonstrates focusing artifacts noted in ionographic printing;

FIG. 2 schematically shows an ionographic printhead of the type contemplated for use with the present invention, in printing relationship with an imaging surface;

Figure 2:
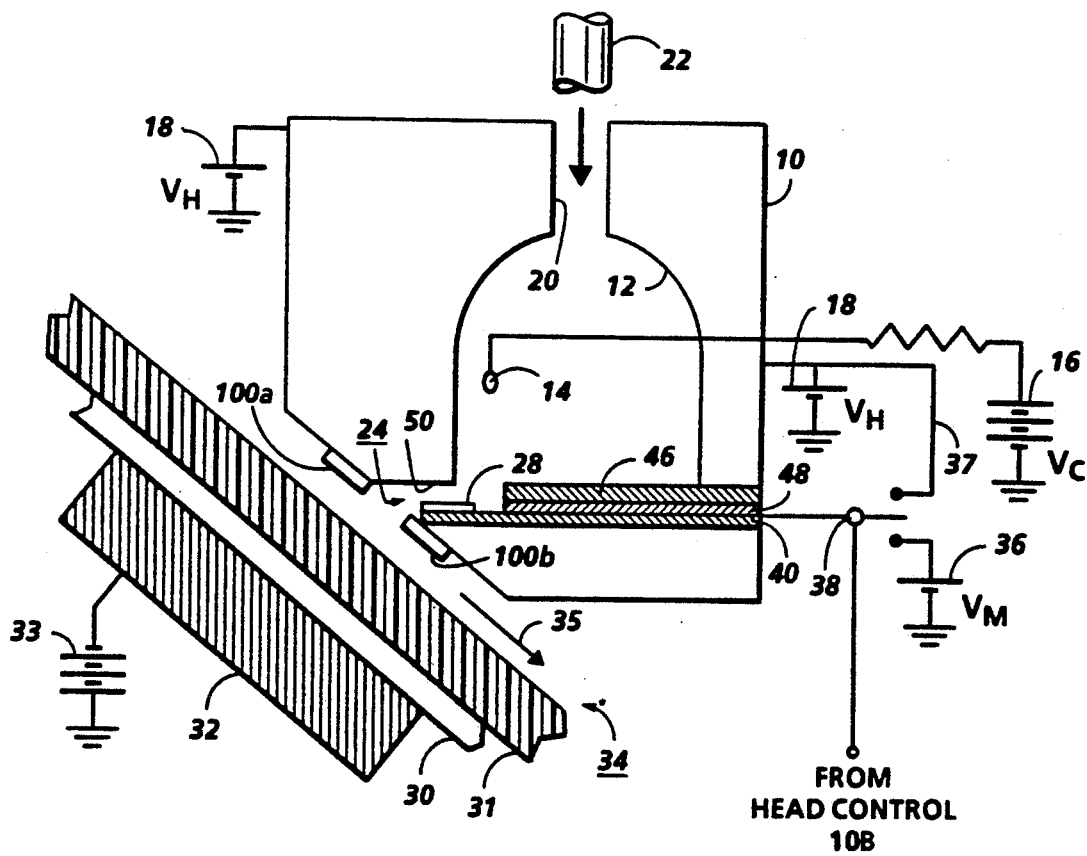

With reference now to the drawings where the showings are for the purpose of illustrating an embodiment of the invention and not for limiting same, FIG. 2 shows a schematic representation of a cross section of the marking head 10 of a fluid jet assisted ionographic marking apparatus similar to that described in commonly assigned U.S. Pat. No. 4,644,373 to Sheridon et al.

Within head 10 is an ion generation region including an ion chamber 12, a coronode 14 supported within the chamber, a high potential source 16, on the order of several thousand volts D.C., applied to the coronode 14, and a reference potential source 18, connected to the wall of chamber 12, maintaining the head at a voltage $V_H$. The corona discharge around coronode 14 creates a source of ions of a given polarity (preferably positive), which are attracted to the chamber wall held at $V_H$, and fill the chamber with a space charge.

An inlet channel 20 to ion chamber 12 delivers pressurized transport fluid (preferably air) into chamber 12 from a suitable source, schematically illustrated by tube 22. A modulation channel 24 conducts the transport fluid out of the chamber from ion chamber 12 to the exterior of the head 10. As the transport fluid passes through ion chamber 12, it entrains ions and moves the ions into modulation channel 24, past modulation electrodes 28. The interior of ion chamber 12 may be provided with a coating that is inert to the highly corrosive corona byproducts produced therein.

Ions allowed to pass out of head 10, through modulation channel 24, and directed to charge receptor 34, come under the influence of a conductive plane 30, provided as a backing layer to a charge receptor dielectric surface 31, with conductive plane 30 slidingly connected via a shoe 32 to a voltage supply 33. Alternatively, a single layer dielectric charge receptor might be provided, passing a biased back electrode to the same effect. Subsequently the latent image charge pattern may be made visible by suitable development apparatus (not shown). In the embodiment, charge receptor 34 is moved in the direction of arrow 35, to provide relative movement between the charge receptor 34 and printhead required for writing a page of image. Direction 35 is often referred to as the slow scan direction or process direction, while the perpendicular direction parallel to the array of modulation electrodes (into the page of FIG. 4) is referred to as the transverse, cross scan, or fast scan direction since it corresponds to the direction of rapid sweep in an optical polygon scanner.

Once ions have been swept into modulation channel 24 by the transport fluid, it becomes necessary to render the ion-laden fluid stream intelligible. This is accomplished by individually switching modulation electrodes 28 in modulation channel 24, between a marking voltage source 36 and a reference potential 37 by means of a switch 38. While the switching arrangement shown produces a binary imaging function, gray levels may be provided by providing a continuously variable voltage signal to the modulation electrodes. The modulation electrodes are arranged on a thin film layer 40 supported on a planar insulating substrate 44 between the substrate and a conductive plate 46, and insulated from the conductive plate by an insulating layer 48.

Modulation electrodes 28 and the opposite wall 50, held at $V_H$, comprise a capacitor, across which the voltage potential of source 36, may be applied, when connected through switch 38. Thus, an electric field, extending in a direction transverse to the direction of the transport fluid flow, is selectively established between a given modulation electrode 28 and the opposite wall 50.

"Writing" of a selected spot charge receptor 34 is accomplished by connecting a modulation electrode to the reference potential source 37, held at $V_H$, so that the ion flux, passing between the electrode and its opposite wall, will not be under the influence of a field therebetween and transport fluid exiting from the ion projector, in that localized zone, will carry the "writing" ions to accumulate ton the desired spot of the image receptor sheet. Conversely, no "writing" will be effected when the modulation voltage is applied to an electrode. This is accomplished by connecting the modulation electrode 28 to the low voltage potential of source 36 via switch 38 so as to impose upon the electrode a charge of the same sign as the ionic species. The ions will be repelled by the charged electrode and be driven into contact with the opposite, conductive wall 50 where the ions neutralize into uncharged, or neutral air molecules. Thus, an imagewise pattern of information is formed by selectively controlling each of the modulation electrodes on the marking array so that the local ion flux associated therewith either exits or is inhibited from exiting the housing, as desired. For simplicity and economy in fabricating a large area, full page-width head, thin film techniques are used. Thin film silicon, in either the amorphous, polycrystalline or microcrystalline forms, has been the material of choice for the active devices in large area ion modulation structures. The relatively low temperature of the amorphous silicon and polysilicon fabrication processes allows a large degree of freedom in the choice of substrate materials, enabling the use of inexpensive materials such as glass, ceramics and possibly some printed circuit board materials.

As an alternative to an ionographic printing head with fluid jet assisted ion flow, it will no doubt be appreciated that other ionographic printheads may be provided where the ion stream could be field directed to the charge receptor. Further, while the description herein assumes positive ions, appropriate changes may be made so that negative ions may be used.

Figure 1:
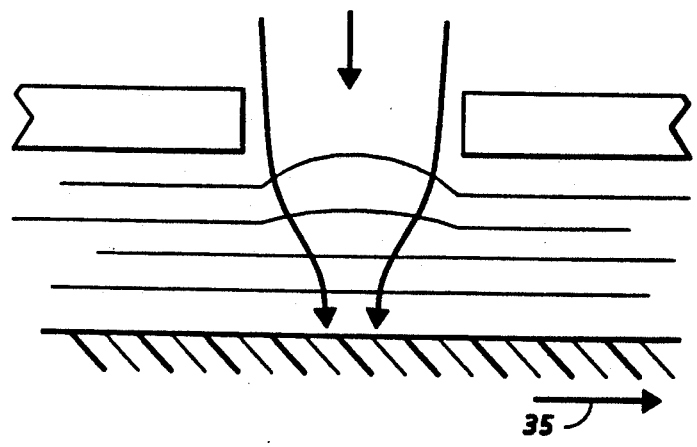
Figure 3:
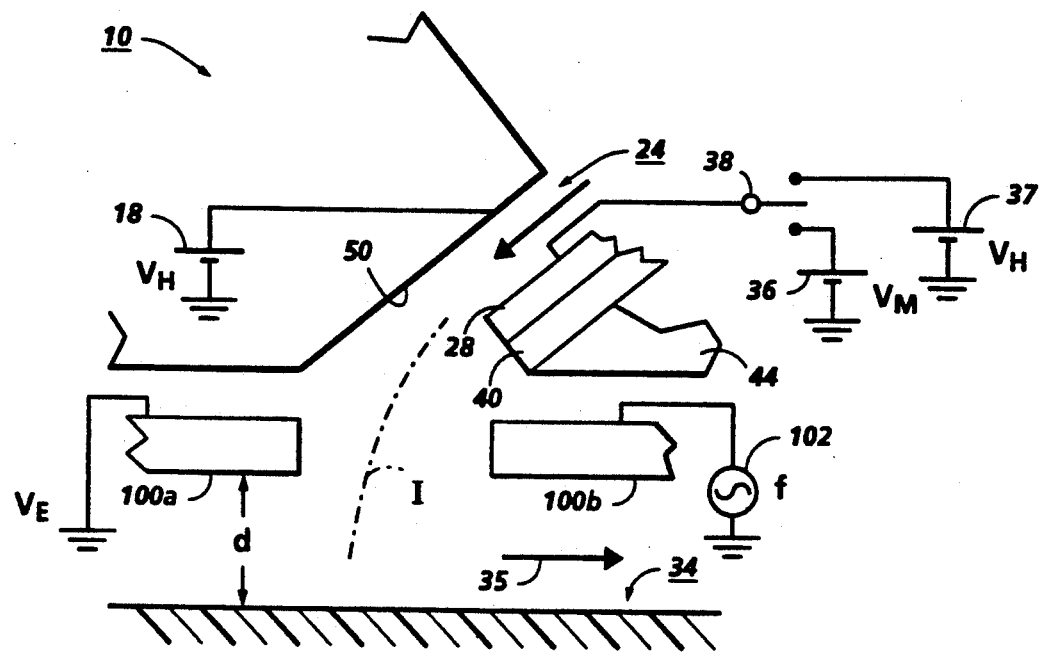
FIG. 3 shows an enlarged view of the modulation channel and its relationship with the imaging surface in conjunction with the present invention.

In accordance with the invention and as shown in FIG. 1, a pair of electrodes 100a and 100b are arranged on upstream and downstream sides of the modulation channel 24. The directions "upstream" and "downstream", refer to the directions anti-parallel and parallel to the process direction 35. As better illustrated now in FIG. 3, which shows an enlarged view of the modulation channel region, the arrangement of electrodes 100a and 100b places them on upstream and downstream sides adjacent the ion stream I. In the illustration of FIG. 3, one of the electrodes is grounded, while the other electrode is electrically connected to an A.C. voltage source 102 having a modest voltage amplitude at a frequency f that provides at least one full cycle, and preferably multiple cycles during the time that any given area on charge receptor 34 is in the writing position (the line where ions are propelled by the projection field in the absence of dithering). The electrodes can alternatively be operated 180 degrees out of phase, in which case the grounded electrode of FIG. 3 is instead connected to a source of voltage with the inverted waveform. This configuration has the advantage that the voltage amplitudes required are only half that of the single ended drive connection shown in FIG. 3.

In one example, given a printer operating at 300 pixels per inch (or spots per inch, (SPI)) in the process direction with a charge receptor velocity of 2 in./sec., the frequency of the A.C voltage source should be at least 600 Hz or cycles per second, to preclude beat frequency banding or strobing effects in the resultant print. Electrodes 100a and 100b may be located within the gap between marking head 10, as shown in FIG. 3, or actually on a surface of marking head 10 facing charge receptor 34, as shown in FIG. 2. The location of electrodes 100a and 100b is dictated by the requirement that the applied A.C. voltage induce a dithering or sweeping motion on the ion stream I, so that it rapidly sweeps upstream and downstream to spread the deposited ions over a larger area than would otherwise occur and compensating for the focusing of the ion beam.

Figure 4:
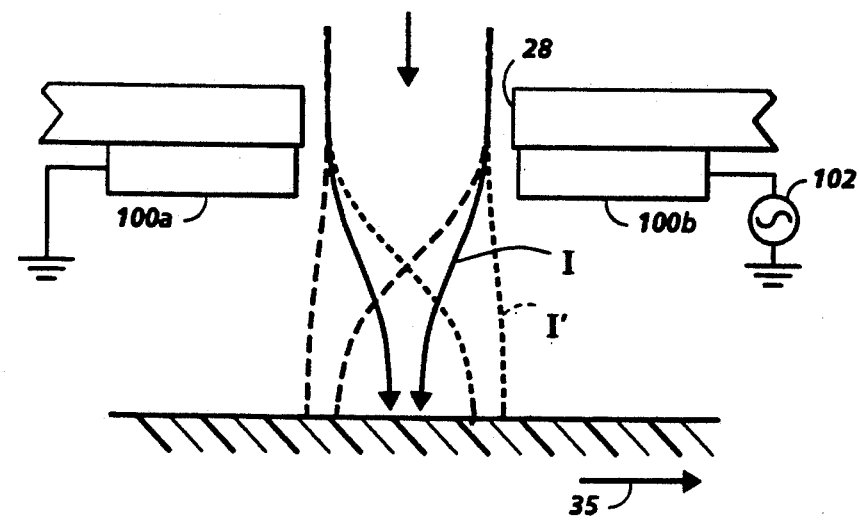
FIG. 4 is a schematic presentation of the principle of the invention fields generated by the present invention, and the effect thereof on the ion stream.

With reference now to FIG. 4, modulation channel 28 is schematically shown with the dithered ion stream I' upstream and downstream limits shown as broken lines and somewhat exaggerated in range for purposes of illustration. Solid lines indicate the profile of the focused ion stream to be expected without the use of the present invention.

It will, of course, no doubt be appreciated that while applicant has proposed an A.C. voltage source used in conjunction with electrodes 100 to produce an A.C. field, equally effective could be two or more D.C. voltage sources having various polarities with voltages applied to the electrodes via a switching network operated in a cyclic manner at an appropriate frequency, essentially applying time dependent directional biasing to the electrodes 100.

Figure 5A:
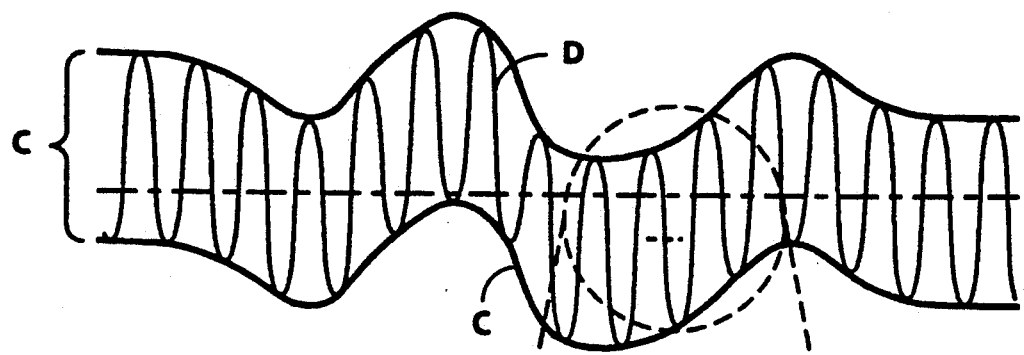
FIGS. 5A and 5B show a representative voltage waveform used for deflecting the ion beam in the present invention.
Figure 5B:
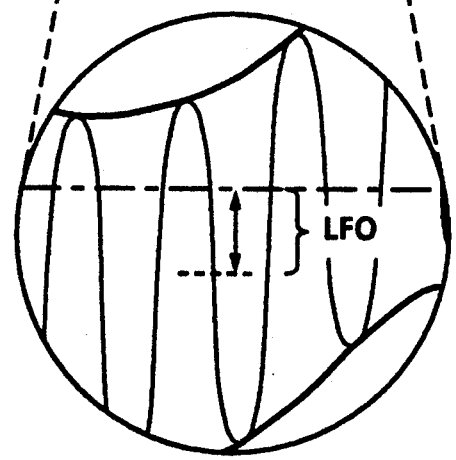

FIGS. 5A and 5B illustrate voltage waveform applied to electrodes 100 for the purpose of intentionally causing a stochastic, slowly changing, net deflection in the position of the ion beam as well as the rapid dithering or oscillatory behavior so far described. As in the earlier description, this waveform, which combines a regularly periodic high frequency relatively constant amplitude component labeled D with a relatively slow component of variable amplitude and frequency composition labeled C, is intended to deflect the ion beam in directions parallel (downstream) and anti-parallel (upstream) to the process direction in a manner resembling the instantaneous shape of the voltage waveform as a function of time.

The low frequency deflection associated with the waveform envelope in FIG. 5A is introduced to correct for small errors in the instantaneous position of the electroreceptor with time, typically the result of mechanical drive train velocity perturbations and vibrations, and referred to generally as electroreceptor motion quality error. At each instant, the correction voltage is the result of determining the actual position of the electroreceptor by a suitable sensing means, such as an optical encoder, and translating any observed deviation from perfectly uniform translational motion represented by the error signal to a derived correction voltage LFO (better seen in FIG. 5A) that has the effect of deflecting the beam in exact proportion and in the same direction as the electroreceptor error such that the ions are deposited at exactly the correct position on the electroreceptor surface. Those skilled in the art will understand that the dithering and motion quality correction functions can be combined in a common waveform that will resemble that in FIG. 5A with no loss in generality and no impairment of either the oscillatory or the net displacement functions.

In the case of an ionographic device in which the ion exit apertures or modulation channels are a series of individual holes, the impact of the focusing artifact will be noted uniformly through the cross section of the ion stream emanating from each hole. In that case, dithering or sweeping is preferably made in directions parallel to both fast and slow scan axes, and accordingly, two orthogonally arranged deflection electrode pairs, each with an A.C. voltage applied to generate fields in the orthogonal directions, is required.

The invention has been described with reference to a preferred embodiment. Obviously modifications will occur to others upon reading and understanding the specification taken together with the drawings. Various alternatives, modifications, variations or improvements may be made by those skilled in the art from this teaching which are intended to be encompassed by the following claims.

I claim:

1. In an ionographic imaging device for printing an image, including a source of ions, means for moving ions in an ion stream towards an imaging surface moving in a slow scan direction to create a pattern of charge thereon, modulation means to modulate the ion stream in accordance with the image, for the formation of a latent image on the imaging surface, and means to alter the path if the ion stream is to account for distortions in the projection field, said altering means including
    first and second deflection electrodes arranged adjacent to the ion stream;
    an A.C. voltage supply, electrically connected between said first and second deflection electrodes, and producing a voltage having a magnitude V to deflect the ion stream by an amount required to account for distortions in the projection field and operating at a frequency f selected to produce dithering of the stream in the slow scan direction and in a reverse slow scan direction.

2. A device as defined in claim 1 wherein said ion source is a coronode driven to corona discharge for the production of ions with a high voltage power supply.

3. A device as defined in claim 1 wherein said means for moving ions includes means for generating a jet of fluid moving past the ion source towards said imaging member, to entrain ions for increased charging efficiency.

4. A device as defined in claim 1 wherein said modulation means includes a plurality of modulation electrodes, each connected to a switched voltage source, said voltage source switch controlled in accordance with the image appearance.

5. A device as defined in claim 1, wherein said frequency f is selected to be a multiple of the pixel line frequency.

6. A device as defined in claim 1 wherein a net deflection of the ion stream in either the slow scan direction or reverse slow scan direction is introduced by adding a time dependent voltage bias to the voltage of magnitude V at frequency f applied to one or both deflection electrodes, whereby the ion stream is repositioned with respect to the electroreceptor surface continuing to dither.

7. A device as defined in claim 1 wherein said voltage of magnitude V varies with said first frequency f selected to dither the ions stream, and a second frequency selected to correct for positioning distortions.

* * * * *